(12) United States Patent
Wilcox et al.

(10) Patent No.: US 12,127,507 B2
(45) Date of Patent: Oct. 29, 2024

(54) ACTIVE MYCELIUM COMPOUND EXTRACTION PROCESS

(71) Applicants: Stevan Wilcox, Como, CO (US); Brandi Darlene Arts, Fairplay, CO (US)

(72) Inventors: Stevan Wilcox, Como, CO (US); Brandi Darlene Arts, Fairplay, CO (US)

( * ) Notice: Subject to any disclaimer, the term of this patent is extended or adjusted under 35 U.S.C. 154(b) by 51 days.

(21) Appl. No.: 17/803,762

(22) Filed: Nov. 14, 2022

(65) Prior Publication Data

US 2024/0155983 A1    May 16, 2024

(51) Int. Cl.
*A01G 18/10*    (2018.01)
*A01G 18/20*    (2018.01)

(52) U.S. Cl.
CPC .............. *A01G 18/10* (2018.02); *A01G 18/20* (2018.02)

(58) Field of Classification Search
CPC .................................. A01G 18/10; A01G 18/20
See application file for complete search history.

(56) References Cited

U.S. PATENT DOCUMENTS

| | | |
|---|---|---|
| 9,803,171 B2 | 10/2017 | Bayer |
| 9,879,219 B2 | 1/2018 | McIntyre |
| 2004/0144020 A1* | 7/2004 | Kerrigan ................ A01H 15/00 47/1.1 |
| 2013/0309755 A1* | 11/2013 | McIntyre .............. C12P 7/6409 435/256.8 |
| 2019/0373935 A1* | 12/2019 | Huggins ............... A23L 33/195 |
| 2020/0352206 A1* | 11/2020 | Wagner-Salvini ........ A23L 2/52 |
| 2021/0251271 A1* | 8/2021 | Soni ........................ A23L 19/01 |
| 2021/0267143 A1* | 9/2021 | Soni ........................ A01G 18/20 |
| 2022/0354068 A1* | 11/2022 | Carlton .................. C12N 1/145 |

FOREIGN PATENT DOCUMENTS

| | | | | |
|---|---|---|---|---|
| CN | 109392596 A | * | 3/2019 | ............. A01G 18/00 |
| CN | 112089044 B | * | 9/2023 | ............. A01G 18/00 |

* cited by examiner

*Primary Examiner* — Monica L Perry
*Assistant Examiner* — Aaron M Rodziwicz
(74) *Attorney, Agent, or Firm* — Randal D. Homburg

(57) ABSTRACT

A method for the production of a mature mycelium extract for sublingual mycelia rich tincture from cultured mushroom spores in a growth medium of cooked natural grains provides the growth medium for mushroom mycelia in a sterile container containing the growth medium, inoculation of the growth medium with mushroom spores into the sterile container to culture growth of mushroom mycelia, harvest a mycelia product and processing the mycelia after using ultrasonic extraction and the addition of food grade ingredients to form a mycelia-rich liquid that is ultimately processed to form a mycelium rich sublingual tincture.

9 Claims, No Drawings

ACTIVE MYCELIUM COMPOUND EXTRACTION PROCESS

CROSS REFERENCE TO RELATED APPLICATIONS

None.

BACKGROUND OF THE INVENTION

1. Field of Invention

A process for the growth, production and extraction of mature mycelium for the creation of a human consumable liquid sublingual tincture and other products using ultrasonic extraction.

2. Description of Prior Art

A preliminary review of prior art patents was conducted by the applicant which reveal prior art patents in a similar field or having similar use. However, the prior art inventions do not disclose the same or similar elements as the present mature mycelium extraction process, nor do they present the material components in a manner contemplated or anticipated in the prior art.

A treatment for sexual reproduction disturbance in males who are obese or with a metabolic disfunction improves structural integrity of testicular tissues and sperm derived from the mycelia of Morchella in U.S. Pat. No. 11,116,807 to Chen. This patent identifies one of the uses for the mycelia from this particular mushroom. A method for the production of a chitinous polymer from fungal mycelium identified in U.S. Pat. No. 9,879,219 to McIntyre, provides the process for growth of the polymeric matrix by growing mycelium in a liquid medium, extracting the mycelium from the liquid suspension, incubating the mycelium for a period of time to induce mycelium cohesion and form a solid material, and drying the solid material to remove moisture and inactivate the mycelium.

In U.S. Pat. No. 9,803,171 to Bayer, a method for making dehydrated Mycelium elements and product is disclosed, including the steps of including mycelium and fibers, and/or particles in a nutrient material to promote mycelium tissue growth, dehydrating the moisture content to a reduced 50% by weight to deactivate the further growth of the mycelium tissue which is thereafter stored, until such time the dried product is rehydrated, reactivating the mycelium to initiate the growth of at least on fruiting body. Kristiansen identifies a processes for the production of an immunostimulant by submerged cultivation of Lentinus edodes in which mycelium from agar plates or a fermented broth is added to the liquid medium in a shake flask or a bioreactor containing nutrients with exposure to air and kept at constant movement at approximately 28 degrees Celsius in U.S. Pat. No. 8,758,768. Kristiansen also identifies compositions comprising polypeptides and polysaccharides using ingredients cultivated in a liquid medium using filamentous fungi for treatment of immune compromised conditions identified in U.S. Pat. No. 7,514,085. An edible fungus is created from fungal mycelia in U.S. Pat. No. 7,635,492 to Finnigan, which, combined with other ingredients to produce a wide range of food products including desserts, drinks, and soups which can be used to treat joint immobility, lower fat uptake, lowering cholesterol, immune stimulation and providing a probiotic. In U.S. Pat. No. 6,090,615 to Nagaoka, a process comprising steps is identified to produce a clear mycelium liquid is produced and added to tonic drinks, plant hormone drugs and cosmetic materials. The process defining steps include inoculation with basidiomycetes in bagasse, proliferation of mycelium, pressurized to obtain a squeeze liquid, separating mycelium from squeeze liquid, adding water and a preferred enzyme, stirring the mixture at a temperature of 30-60 degrees Celsius, and heating the liquid mixture to 95 degrees Celsius to perform sterilization, inactivating the enzymes and producing an extract of the mycelium containing culture medium.

None of the prior art includes the same steps nor do they combine to produce the same products using similar processes of methods as identified below.

SUMMARY OF THE INVENTION

The subject matter of the disclosed process includes steps which grow mycelium active compounds, an extraction process, and ultimately create a concentrated sublingual tincture for consumption for one or more health benefits, including improved cognition and memory, energy and stamina, sleep and cardiovascular support, liver health, digestion and probiotic improvement, antioxidant and DNA support, detoxification, mood and stress improvement, nerve support and injury recovery.

Mycelium (plural mycelia) is a root-like structure of a fungus consisting of a mass of branching, thread-like hyphae. The further process is followed to grow, harvest and extract useful compounds that can be consumed using a unique process. This process produces a useable concentration that is then stabilized for human consumption.

The process begins with a liquid culture injected into canning containers (jar, plastic bags) that contains a growing medium (corn, rye berries, brown rice, oats) and initially sterilized under heat and pressure. The jars of sterilized cultured medium are kept in an appropriately prepared and managed incubation area for a specified amount of time per strain. Over time (approx. two weeks to six months) the liquid culture develop mycelium on the specific substrate. Specific strains of mycelium are matured by exposure to light and air to promote active compound concentrations before harvest. The mycelium is then blended with added liquid preparation into a mash and placed into an ultrasonic extractor where additional natural ingredients are added. After a specific time, most active ingredients have been extracted from the mycelium and now are in a liquid medium state.

This liquid contains the active ingredients that are filtered and further processed with color and flavoring. This is a concentration that can now be used for sublingual use and as a base for additional products. What makes the process unique and novel is the use of matured mycelium to promote active compounds allowing the final product to be concentrated, stabilized and standardized for specific sublingual dosing with rapid delivery and onset. The process is fast, efficient, repeatable, scalable, and extremely effective.

Most distinguishing, the present process is useful, unique and non-obvious as the use of mature mycelium for a concentrated sublingual application of specified medicinal and useful compounds of beneficial fungi strains. Extracting the mycelium using ultrasonic vibration in specific food grade solvents, including antioxidants, food grade acids, and cold temperatures promotes the enzymatic chitin dissolution and release of medicinal and useful compounds for the preparation of a concentrated, stabilized, and standardized dose of a sublingual tincture with rapid delivery and onset. The steps in the process include: cook, sterilize, inoculate, Culture, Harvest, Process, Filtration and Test, as further disclosed below in greater detail.

DESCRIPTION OF THE DRAWINGS

There are no drawings submitted with this application.

DESCRIPTION OF THE PREFERRED EMBODIMENT

Mushrooms are a fungal organism that comprises three basic parts—the fruiting part, or the edible portion is some mushrooms, the spores which are the equivalent for seeds in plants which are responsible for reproduction, and the mycelium, which are the equivalent of roots. There is a dispute over which portion, the fruiting body or the mycelium, when consumed, provide the most health benefits to humans. This patent does not address that dispute. It merely addresses the novel process for the extracting compounds from mycelium in a culture growth medium for the purpose of producing a tincture for sub-lingual dosing for those consumers who believe in the health benefit of such consumption.

Regarding other non-consumable beneficial uses of the extracted mycelium, in addition to beneficial health effects when ingested, include use as a meat alternative, especially ground meat products, for decomposition of pollutants, including plastics, hydrocarbons, unrefined oils, and even some nuclear wastes, and as an alternative building material or structural fabric, including synthetic leather, commercial packaging, insulation, building blocks, wall tiles and particle boards. As indicated above, the process comprises the following simple steps which will be further expanded below. The steps within the process are cook, sterilize, inoculate, culture, harvest, process, filtration and test.

In the first step in the production of food grade mycelium, the substrate is created, which can be varied. In this process, it is preferred based upon prior experimentation, that the most productive substrate is produced from brown rice, corn, rye wheat and oats, which are cooked to include an adequate moisture content for mushroom growth. The cooked substrate, which is now sterile, is placed in a sterilized clear-walled canning vessel having rubber injection ports and pressure vents.

Sterilization of the vessel occurs using both heat and pressure to eliminate competing organic organisms, including mold, bacteria and unwanted spores, with the above pressure vents further providing a regulated internal vessel pressure. Inoculation is conducted through the rubber ports in the vessel by delivering a liquid mushroom spore through liquid syringes, after which the vessel, substrate and the liquid spore content is grown and matured in a controlled environment until the cultured mycelia have obtained a desired growth within the substrate, visible through the clear walls of the vessel. This growth ideally should take from two weeks to six months depending on the strain variation. The culture is obtained from the inoculated spore growth by producing enzymes that break down fibers and starches in the substrate to produce highly nutritive compounds. In addition to time, this portion of the process takes correct ambient temperature suited for the type of fungus and total darkness.

After the desired cultured growth is obtained, the processing phase begins. This processing occurs once the vessels are fully cultured and/or matured by exposure to natural light and air for specified periods to promote acceleration of medicinal and useful compounds prior to harvest. Purified water is added to the culture to produce a mash. The mash is placed into an ultrasonic extractor where either ice or more water is added, depending on the strain and growth medium compounds. Additionally, an antioxidant, culinary solvents, food grade acids or a combination there of to create an enzymatic chitin dissolution to thereby extract all medicinal and useful compounds contained in the mycelium. Once this mash composition is blended, the ultrasound extraction takes place.

The ultrasonic extraction process uses a cavitation effect created by high frequency vibration in the liquid medium containing the mash compounds. The microscopic bubbles created by the cavitation process implode and burst cells rapidly and with great force. This force is so strong, the bursting bubbles are commonly used to clean precious metals and car parts, so its effect on the soft compounds within the mash are violent and break down the mash components over a period of 30 minutes while keeping the process at the desired low temperatures to prevent unwanted oxidation or decarboxylation of medicinal and useful compounds.

Filtration follows the ultrasonic extraction wherein the extracted contents are pressed to remove the nutrient rich liquid compounds from the remaining solids. The liquid is then submitted to vacuum filtering process. The culinary solvent, antioxidants, and food grade acids may be used as extraction and preservation agents, again dependent upon the strained and filtered content. Application as a tincture under the tongue is recommended to bypass metabolic actions that could disrupt the optimal effects of the compounds found in the mycelium that are suspended within the tincture solution, and to offer rapid delivery and onset of medicinal and useful compounds. The mycelium-rich tincture is packaged in a sterile manner and appropriate for liquid contents.

The final process stage is testing by an independent third-party laboratory, which tests random samples of the product per batch to ensure the quality and safety of the product, and for consistent identified chemical constituents. These testing procedures ensure the content of the tincture for purity, effectiveness and content of the desired mycelium. Liquid chromatography quadrupole time-of-flight mass spectrometry (LC-QTOF) is used to identify major metabolites, including mycelium in the extract solutions. Reversed-phase liquid chromatography (RP-HPLC) is a preferred method for peptide and protein separation and is most compatible with mass spectrometry, providing separation of mixed peptides and proteins at attomolar levels for further analysis, and is very complimentary for use with LC-QTOF, as well as electrospray ionization quadrupole time-of-flight (ESI-QTOF), which is another mass spectrometry tool used to ionize proteins in solution. This testing including LC-QTOF to compare the sample product with known special database analysis for content, with RP-HPLC achieving characterization of chemical components and ESI-QTOF tandem mass spectrometry to analyze precursor ions.

This testing is divided into two parts. First, the mycelium strains are individually tested to confirm the chemical constituents and desired major which are noted for metabolite name, observed retention time, abundances and the precursor mass/ion ratio of the detected compounds, as noted in the preferred testing methods for random production analysis. The content analysis and measurement of the targeted content also maintains compliance standards for local, state and federal labeling standards.

The second testing includes in-house shelf stability and beta testing to explore other complimentary health benefits.

It is unknown just how many different health benefits the consumption of refined mycelium tincture bypassing the normal digestive routes are possible. The product is known to be safe when grown and prepared from safe fungi, so it does not appear that any negative health benefits are presented. To date, the best results are known from testimonials from those who have sought alternative health benefits when traditional western medicine has failed to cure or reduce health issues, such testimonials giving account of the unanticipated results of this product derived from the claimed processing methods.

While the invention has been particularly shown and described with reference to a preferred embodiment thereof, it will be understood by those skilled in the art that changes in form and detail may be made therein without departing from the spirit and scope of the invention.

What is claimed is:

1. A method of production for a mature mycelium extract for a sublingual tincture, comprising a series of steps of:
   cooking a substrate for mushroom growth made from a mixture of grains and containing a moisture content;
   sterilizing a clear walled canning vessel and lid, said canning vessel further defining at least one rubber injection port and pressure release vents, said sterilization being achieved through a combination of temperature and pressure, wherein said cooked substrate is placed within said canning vessel with the lid secured upon said canning vessel;
   inoculating said substrate with a liquid containing mushroom spores by a sterilized syringe through one sterile rubber injection port;
   culturing said substrate containing liquid mushroom spores in an incubation area in a controlled environment;
   harvesting developed and matured mycelia and substrate by adding purified water to form a mash comprised of antioxidant(s), culinary solvents, food grade acids or a combination thereof to create an enzymatic chitin dissolution to extract all medicinal compounds contained in the mycelium
   processing said mash by placing said mash within an ultrasonic extractor in ice, additional purified water, food grade acids (PH adjustments) and/or culinary solvents, or a combination thereof, to cause enzymatic chitin dissolution required to break down and extract mycelium-rich liquids from the mycelial mash;
   filtering said mycelium-rich liquids from said solids using a Burchner filtering funnel as well as, separatory gravity funnels, to form a remnant mycelium-rich tincture for sublingual application for any potential health or nutritional benefit as opposed to ingestion, which disrupts the effectiveness of the nutrient rich mycelium and avoid metabolic action associate with ingestion.

2. The method for the production of the mycelium extract of claim 1, further comprising said substrate including a mixture of brown rice, corn, oats and rye wheat.

3. The method for the production of the mycelium extract of claim 1, further comprising said food grade acids and/or culinary solvent is food grade ethyl alcohol of said tincture.

4. The method for the production of the mycelium extract of claim 1, further comprising:
   said substrate including a mixture of brown rice, corn, oats and rye wheat; and
   said culinary solvent is food grade ethyl alcohol and PH adjusting agents including, food grade acids within said tincture to promote enzymatic chitin dissolution.

5. A method for production of a mature mycelium extract forming a sublingual tincture, comprising a series of steps of:
   cooking a substrate for mushroom growth made from a mixture of grains and containing a moisture content for mushroom growth;
   sterilizing a clear walled canning vessel and lid, said canning vessel further defining at least one rubber injection port and pressure release vents, said sterilization being achieved through a combination of temperature and pressure, wherein said cooked substrate is placed within said canning vessel with the lid secured upon said canning vessel;
   inoculating said substrate with a liquid containing mushroom spores by a sterilized syringe through said at least one rubber injection port;
   culturing said substrate containing said liquid containing mushroom spores in an incubation environment until said spores have developed into mature mycelia and developed growth within said substrate, visible through said clear walled vessel;
   harvesting said developed mycelia and substrate by adding purified water to form a mash;
   processing said mash by placing said mash within an ultrasonic extractor in ice, additional purified water, a culinary solvent, food grade acids or a combination thereof, to break down and extract mycelium-rich liquids from the mash;
   filtering said mycelium-rich liquids from solids under pressure and drying said liquid extract under suction below a filter after which said culinary solvent is added to said filtered and dried liquid content to form a mycelium-rich tincture; and
   testing said mycelium-rich tincture for mycelium content, composition and purity to ensure compliance with local, state or federal standards for human consumption using liquid chromatography or mass spectronomy, wherefore said mycelium-rich tincture is for sublingual application instead of ingestion to bypass metabolic actions that disrupt optimal effects of the nutrient rich mycelium suspended within the culinary solvent tincture.

6. The method for the production of the mycelium extract of claim 5, further comprising said substrate including a mixture of brown rice, corn, oats and rye wheat.

7. The method for the production of the mycelium extract of claim 5, further comprising said culinary solvent is food grade ethyl alcohol, within said tincture. culinary solvent, food grade acids or a combination thereof, to break down and extract said mycelia from the mash.

8. The method for the production of the mycelium extract of claim 5, further comprising:
   said substrate including a mixture of brown rice, corn, oats and rye wheat; and
   said culinary solvent is food grade ethyl alcohol said tincture. a culinary solvent, food grade acids or a combination thereof, to break down and extract said mycelia from the mash.

9. The method for the production of the mycelium extract of claim 5, said testing including:
   liquid chromatography quadrupole time-of-flight mass spectrometry (LC-QTOF) used to identify major metabolites, including mycelium in the extract solutions;
   reversed-phase liquid chromatography (RP-HPLC) is for peptide and protein separation and is most compatible with mass spectrometry, providing separation of mixed peptides and proteins at attomolar levels for further analysis, which is exceptionally complimentary for use with LC-QTOF; and electrospray ionization quadrupole time-of-flight (ESI-QTOF), which is another mass spectrometry tool used to ionize proteins in solution, wherein said LC-QTOF is used to compare the sample product with known special database analysis for content, RP-HPLC achieving characterization of chemical components, and ESI-QTOF tandem mass spectrometry to analyze precursor ions.

* * * * *